UNITED STATES PATENT OFFICE.

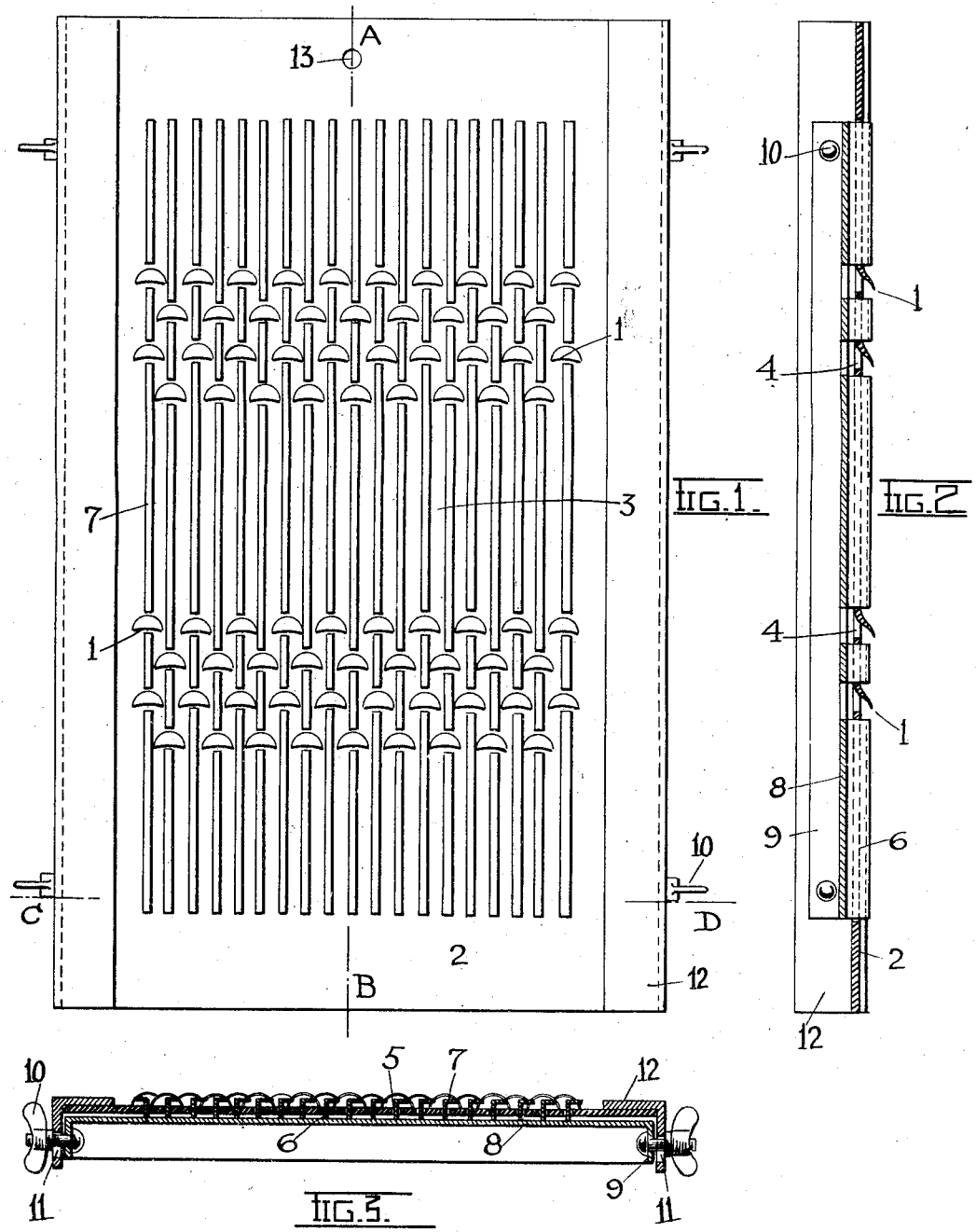

HARRIET PLAGER, OF BROCK, NEBRASKA.

VEGETABLE-CUTTER.

1,061,867.

Specification of Letters Patent.

Patented May 13, 1913.

Application filed October 7, 1912. Serial No. 724,373.

*To all whom it may concern:*

Be it known that I, HARRIET PLAGER, a citizen of the United States, residing at Brock, in the county of Nemaha and State of Nebraska, have invented certain new and useful Improvements in Vegetable-Cutters, of which the following is a specification.

My improvement relates to cutters and more particularly to a type of cutter for cabbage, potatoes or in fact any vegetable or fruit it is desired to cut into slivers or strips.

The principal object is to produce a cutting means for cabbage that will avoid the necessity of chopping after slicing.

A further object is to provide an adjustable cutter wherein the slivers or strips may be made uniformly large or small as desired or the device simply adjusted to cause a mixture of slivers or strips from the maximum to the minimum in size.

In the accompanying drawings in which like reference characters indicate like parts, and in which I have illustrated an embodiment of my improvement Figure 1 is a plan view of the cutter. Fig. 2 is a longitudinal section on the line A—B of Fig. 1, and Fig. 3 is a cross-section on the line C—D of Fig. 1.

Referring specifically to the several features, 1 indicates semi-circular cutting edges disposed upon a cutting plate 2 in a plurality of rows, the said rows being parallel transversely but staggered longitudinally and being in two groups having a shifting space 3 between the rows. The cutting plate is further provided with openings 4 and longitudinal slots 5, the latter being for the purpose of receiving the supporting means 6 for the superimposed adjustable rack 7. Beneath the cutting plate and normally parallel thereto is an under plate 8 integral with the superimposed adjustable rack 7 and the supporting means 6. Downward flanged portions 9 are integral with the said under plate 8 and have secured at suitable points locking means 10, the said means extending through slots 11 in the sides of an angular bounding and stiffening strip 12. 13 is a hole for hanging the cutter on a nail.

The device will probably be made of metal of a non-corrosive nature, the several parts being stamped out by dies and shaped by formers.

I may conclude to manufacture the adjustable rack 7, the supporting means 6, the under plate 8 and the downward flanged portion 9 of one piece of plate, or I may make the plate 8 and the downward flanged portion 9 of one piece and the rack 7 and the supporting means 6 of another, and secure the two elements in any workmanlike manner. I shall probably prefer the former, in which case, after the sheet of metal is blanked the sides will be flanged downwardly at right angles for the portion 9; the plate 8 will be split and the connecting means 6 upset; the upset tongues or connecting means will be passed up through the longitudinal slots 5 of the plate 2, and the rack portion 7 formed by hand or machine flanging. In case I adopt the latter means of manufacture, after the plate 8 is downwardly flanged for the portion 9 and the tongues or connecting means 6 are secured to the said plate 8, the former will be passed up through the slots 5 and flanged over as shown in a manner similar to that described above. The manner of adjusting the superimposed rack with respect to the cutting plate 2 will be by simply loosening the wing nuts or locking means 10, raising or lowering the plate 8 by reason of the slots 11 to the desired point, and reclamping the parts by setting up on the said locking means 11.

The operation of cutting, with cabbage or other vegetable, is obvious; the size of slivers may be regulated by elevating or depressing the superimposed rack, thus exposing a greater or less portion of the cutting edges. The slivers may all be made uniform by arranging the under plate parallel with the cutting plate, or they may be made mixed from the maximum to the minimum in size by setting the lower plate at an angle to the cutting plate, thus exposing more of the cutting edge at one end of the cutter than at the other. In running the vegetable over the cutter after the first group of cutting edges has been passed, a slight turn of the wrist while in the free space 3 which I have called the shifting space, causes a better cutting effect when passing over the second group of cutters.

In some instances in the manufacture of the device I may conclude to omit the adjustable rack for the sake of a cheaper grade of cutter. The price of manufacture however, will be very slight when made in quantities by blanking and forming dies I will of course claim the right to use any material or to alter the arrangement, size or proportions, or in fact to make any slight changes in the preferred form here shown as long as I keep within the scope of the annexed claim.

I claim:

1. A cutting means for vegetables comprising a plurality of upset cutting edges disposed upon a plate and integral therewith, and a rack disposed above and normally parallel to the cutting plate, the said rack being adjustable vertically.

2. A cutter having a plurality of up-set semicircular cutting edges disposed upon a plate and integral therewith, the said cutting edges being disposed in a plurality of rows, the said rows being parallel transversely but staggered longitudinally, the said plurality of rows being in two groups, a shifting space between the groups, and a rack disposed above and normally parallel to the cutting plate, the said rack being adjustable vertically.

3. A cutter having a plurality of up-set cutting edges disposed upon a plate and integral therewith, the said cutting edges being disposed in a plurality of rows parallel transversely but staggered longitudinally, said rows being in two groups, a shifting space between the groups and a rack disposed above and normally parallel to the cutting plate, an under plate and connecting means between the superimposed rack and the said under plate, the said rack, under plate and connecting means being adjustable vertically, and means for fixedly securing the same in any position of adjustment.

In testimony whereof I affix my signature in presence of two witnesses.

HARRIET PLAGER.

Witnesses:
H. B. VILLARS,
W. A. DOOLITTLE.

Copies of this patent may be obtained for five cents each, by addressing the "Commissioner of Patents, Washington, D. C."